United States Patent
Berrang

(10) Patent No.: US 9,537,143 B2
(45) Date of Patent: Jan. 3, 2017

(54) LEAD ACID CELL WITH ACTIVE MATERIALS HELD IN A LATTICE

(75) Inventor: Peter G. Berrang, Saanichton (CA)

(73) Assignee: Epic Ventures Inc., Saanichton (CA)

(*) Notice: Subject to any disclaimer, the term of this patent is extended or adjusted under 35 U.S.C. 154(b) by 725 days.

(21) Appl. No.: 13/884,930

(22) PCT Filed: Nov. 10, 2010

(86) PCT No.: PCT/CA2010/001809
§ 371 (c)(1),
(2), (4) Date: May 10, 2013

(87) PCT Pub. No.: WO2012/061919
PCT Pub. Date: May 18, 2012

(65) Prior Publication Data
US 2013/0224579 A1    Aug. 29, 2013

(51) Int. Cl.
| | |
|---|---|
| H01M 4/14 | (2006.01) |
| H01M 4/16 | (2006.01) |
| H01M 4/22 | (2006.01) |
| H01M 4/73 | (2006.01) |
| H01M 4/82 | (2006.01) |
| H01M 10/06 | (2006.01) |
| H01M 4/68 | (2006.01) |

(52) U.S. Cl.
CPC ............... *H01M 4/14* (2013.01); *H01M 4/16* (2013.01); *H01M 4/22* (2013.01); *H01M 4/68* (2013.01); *H01M 4/73* (2013.01); *H01M 4/82* (2013.01); *H01M 10/06* (2013.01); *Y02E 60/126* (2013.01); *Y02P 70/54* (2015.11)

(58) Field of Classification Search
CPC .................................. H01M 4/14; H01M 4/22
USPC ............................ 429/204; 427/58, 122, 123
See application file for complete search history.

(56) References Cited

U.S. PATENT DOCUMENTS

| | | | |
|---|---|---|---|
| 3,862,861 | A | 1/1975 | McClelland |
| 4,289,835 | A | 9/1981 | Lee et al. |
| 4,707,911 | A | 11/1987 | Kober |
| 4,713,306 | A | 12/1987 | Pinski |
| 4,865,933 | A | 9/1989 | Blanyer et al. |
| 5,047,300 | A | 9/1991 | Juergens |
| 5,128,218 | A | 7/1992 | Tokunaga et al. |
| 5,156,935 | A | 10/1992 | Hohjo et al. |

(Continued)

FOREIGN PATENT DOCUMENTS

| | | |
|---|---|---|
| CA | 2367561 A1 | 8/2002 |
| CA | 2726308 A1 | 8/2010 |

(Continued)

OTHER PUBLICATIONS

K. Ihmels and W. Böhnstedt, "Separator Materials for Valve-Regulated Lead-Acid Batteries", Valve-Regulated Lead-Acid Batteries, 2004, pp. 193-204, Elsevier.

*Primary Examiner* — James Lee
(74) *Attorney, Agent, or Firm* — Smiths IP

(57) ABSTRACT

An electrode for a lead-acid voltaic cell comprises a high surface area, high porosity 3-dimensional lattice structure wherein the core elements forming the lattice are substantially contiguous. The core elements are coated with one or more corrosion resistant and conductive materials, and solid active materials are coated on the core elements and retained within the matrix. The lattice structure acts as the current collector.

6 Claims, 6 Drawing Sheets

(56) References Cited

U.S. PATENT DOCUMENTS

| | | | |
|---|---|---|---|
| 5,266,423 A | 11/1993 | Sklarchuk | |
| 5,296,261 A | 3/1994 | Bouet | |
| 6,232,017 B1 | 5/2001 | Tsuchida | |
| 6,458,489 B1* | 10/2002 | Alzieu et al. | 429/225 |
| 6,617,071 B2 | 9/2003 | Chen et al. | |
| 6,689,509 B2 | 2/2004 | Zucker | |
| 6,979,513 B2 | 12/2005 | Kelley | |
| 7,060,391 B2 | 6/2006 | Gyenge et al. | |
| 7,517,370 B2 | 4/2009 | Petersen | |
| 7,592,094 B2 | 9/2009 | Kelly | |
| 2009/0269658 A1 | 10/2009 | Shukla et al. | |
| 2009/0269666 A1 | 10/2009 | Lara-Curzio et al. | |
| 2010/0009262 A1 | 1/2010 | Gerber | |
| 2010/0035156 A1* | 2/2010 | Kelley | 429/228 |
| 2010/0040950 A1* | 2/2010 | Buiel | H01G 9/04 |
| | | | 429/211 |

FOREIGN PATENT DOCUMENTS

| | | | |
|---|---|---|---|
| EP | 0360942 A1 | 4/1990 | |
| JP | 07-094207 | 4/1995 | |
| JP | 09-129216 | 5/1997 | |
| JP | 18-066243 | 3/2006 | |
| JP | 2006-318879 A | 11/2006 | |
| WO | 2006/070405 A1 | 7/2006 | |
| WO | WO 2008/051885 * | 5/2008 | H01G 9/04 |
| WO | 2010088755 A1 | 8/2010 | |

\* cited by examiner

LEAD ACID CELL WITH ACTIVE MATERIALS HELD IN A LATTICE

FIELD OF THE INVENTION

The invention relates to lead-acid batteries. More specifically, the invention relates to the design and method for forming cells or electrodes for lead-acid batteries.

BACKGROUND TO THE INVENTION

The basic electrochemistry of the lead-acid battery was discovered over 140 years ago. It is relatively simple and well documented. The active materials involved in the battery chemistry are shown in Equation 1 below.

$$Pb+PbO_2+2H_2SO_4 \leftrightarrow 2PbSO_4+2H_2O \qquad (Eq.\ 1)$$

Lead-acid batteries are widely used worldwide due to their low cost, robustness and acceptable energy density. However, they are heavy, and contain aqueous sulfuric acid which is corrosive. The lead-acid battery is inherently heavy because the anode and cathode contain high density lead and lead-based materials. The lead-based materials are generally formed into a "paste" which is held in a rigid "grid" structure for support. The paste is shaped into a plate supported by the grid substrate. The paste is subsequently treated and cured to form a high surface area "sponge" lead in the negative plate and lead dioxide in the positive plate. For example, U.S. Pat. No. 7,517,370 describes a method for making such a paste. As the lead-based grid structure adds considerable weight to the battery, various efforts to reduce grid/plate weight have been undertaken. Only about 50% of the active materials are actively involved in the electrochemical reactions, further compounding efforts to reduce overall battery weight.

U.S. Pat. No. 4,707,911 discloses a self-supporting porous electrode, without plates or grids to achieve a lighter battery. The electrodes are made by adding a leachable component to a molten lead mixture to form a solid in the required configuration, and removing the leachable component to create a porous electrode with a network of relatively uniformly distributed voids. The walls of the pores are then oxidized to form the electrochemically active material.

U.S. Pat. No. 4,713,306 describes a battery with at least a portion of the positive plate coated with electrically conductive doped tin oxide, where the positive plate can be in the form of organic or inorganic fibers in, for example, woven form. The tin oxide coating increases the conductivity. Such design enhances battery performance by allowing some conductivity to the non-conducting lead sulfate active material. U.S. Pat. No. 7,060,391 teaches the use of a reticulate carbon substrate having pores and a lead-tin containing alloy applied to such a substrate.

U.S. Pat. No. 5,156,935 describes the use of electrically conductive "wiskers" selected from carbon, graphite or potassium titanate mixed within the active materials of the negative and positive electrodes to provide lower weight, charge and volume efficiency, and improved resistance to sulfation.

U.S. Pat. No. 5,296,261 describes a method for producing a sponge metal made from nickel, copper or lead using a polymer sponge as a template which is impregnated with a solution of nitrite or sulfate of the metal. The object of the invention was to create a microporous metal structure for use as an electrode in portable alkaline storage cells. No reference is made to the electrochemical or corrosion protection of such an electrode in a highly oxidizing and corrosive environment, as is present in a lead-acid battery, nor is there any reference to the coating of such a metal substrate with any active materials.

U.S. Pat. No. 6,232,017 describes a lead-acid battery grid design that reduces the total weight of the battery by providing for an electrode grid comprising a reticulate made of an organic or inorganic compound (i.e. a sheet of glass fibers). Such a design allows for a battery weight reduction, especially for the negative electrode. A lead or lead alloy electricity collecting part covers part of the reticulate, where the grid can be covered with a thin film of a lead alloy on the reticulate surface.

U.S. Pat. No. 6,617,071 teaches a method whereby the battery plate is covered with a conductive polymer which is then coated with nanoscale particles of active material. Such design serves to reduce the weight of the battery and minimize positive grid corrosion. The design provides for the substantial utilization of the active material, as the nanoparticles are entrained and held within the conductive polymer skeleton and provide a large surface area for reaction. The conductive polymer has a rigid porous structure to promote the diffusion of acid and ionic species, but is still able to act as a "spring" during charging/discharging as the active materials change volume. However, the disclosed approach still requires a grid plate having at least one surface. Further, the conductive polymer skeleton limits the size of the active particles held therein to "nanoscale size", thereby greatly limiting the mass of held particles, and thus the energy density of this design. The small size of the porous polymer structure limits the diffusion of the acid and ionic species, with the potential of the particles clogging the nano-sized pores during the discharge cycle, thereby limiting the rate of charge/discharge. Additionally, since the nanoparticles are added to the polymer after it is polymerized on the battery grid, the depth to which the nanoparticles can be entrained is greatly limited by the nano-sized pores within the polymer.

US Patent Publication No. 2009/0269658 A1 proposes a grid structure comprised of a low density material such as acrylonitrile butadiene styrene, which is then coated with a metal such as copper or nickel, followed by a coating of lead/lead alloy, followed by electrodepositing a layer of a conductive polymer such as polyanaline. However, such design still requires a grid/plate structure onto which the active and protective layers are coated. No reference is made to dealing with the reactive materials on the multi-coated substrate or the electrochemistry and reactions of the reactive materials.

To obtain reasonable energy storage capacity, porous positive and negative plates with high surface area are preferable. This can be achieved by applying a paste (ie. lead and lead oxide) over a lead-based grid. Such "pasted plates" are made porous by adding leachable materials to the active materials, which are subsequently removed. For example, U.S. Pat. No. 5,266,423 discloses the addition of magnesium, zinc or magnesium to the lead or lead-alloy, which is prepared by casing, then pulverized, with the additives finely dispersed in the lead or lead-alloy particles which were added to the paste. The additives are then leached by sulfuric acid to create a porous lead or lead-alloy matrix.

U.S. Pat. No. 5,047,300 describes the use of ultra-thin non-perforated electrode plates coated with an ultra-thin layer of active material with thin absorptive separator material layers. This arrangement provides for a large ratio of plate surface to active material, low internal resistance and heat dissipation during discharge. However, over time, such plates are subject to clogging of the pores by growth of non-conductive lead sulfate crystals. Such pore-clogging limits the rate of charge and discharge, and reduces cycle lifetime. These non-conductive crystals continue to grow and aggregate over repetitive discharge cycles, becoming increasingly difficult to convert back to lead-dioxide during the charge cycle. The sulfuric acid electrolyte becomes unable to penetrate the now-clogged pores and the electrical conductivity to the grid (collector) plate is lost, increasing the internal resistance and slowing the charge rate. This so-called "sulfation" process is a key limiting factor in battery charge/discharge capacity, ultimately causing the battery to fail. Various techniques have been developed to limit battery sulfation. For example, U.S. Pat. No. 7,592,094 B2 discloses a method for introducing mechanical excitation into the battery to minimize sulfation. That patent provides an extensive review of the prior art, which relate to methods for inducing electrical pulses to remove or reverse the sulfation process.

U.S. Pat. No. 6,979,513 describes a battery current collector having a carbon foam made from a carbonized wood substrate. The active materials are disposed on the carbon foam collector. No reference is made to protecting the surface of the carbon foam. Accordingly, such a design is prone to corrosion of the carbon material in the highly oxidative and acidic conditions at the positive electrode of a lead-acid battery, resulting in $CO_2$ generation, and gradual loss of the carbon foam support structure during repetitive charge/discharge cycles. Additionally, this patent teaches the use of a paste or slurry of the active materials applied to the current collector, using a paste-containing transfer sheet, dipping or painting method, which approaches are limited to coating relatively large pores to a limited depth, where the foam collector acts essentially as a grid support for the active material paste or slurry.

US Patent Publication No. 2009/0269666 A1 discloses an electrochemical cell, including a lead-acid battery cell, where the carbon fiber structures are used to fabricate a grid/current collector to achieve weight reduction of the battery and to increase charging rate using a large surface area to active material. This patent teaches the use of a buffer layer between the graphite fibers and active materials where said buffer layer is comprised of a ternary carbide (ie. $Ti_3SiC_2$ or $Ti_2PbC$), or noble metals such as lead, gold, silver, tantalum, platinum, palladium or rhodium. In one embodiment, thin current collecting plates are comprised of the carbide alloy and are reinforced with graphite fibers and active materials electroplated on each side. The approach still requires a current collecting plate and active materials which are electroplated only onto the surface of the grid. No reference is made to active materials deposited to or held within a 3-dimensional porous lattice structure.

Another salient issue of lead-acid battery chemistry is that the active materials at the positive and negative plates change dimensions in the x-y and z planes during the charge and discharge cycle. During the discharge cycle, the positive plate active material (lead-dioxide) converts to lead sulfate, where the lead sulfate structure expands by about 92%. Similarly, the negative plate active material (pure lead) also converts to lead sulfate on discharge, expanding by about 164%. During the charge cycle, the lead sulfate at both the positive and negative plate contracts back to lead-dioxide and pure lead, respectively. Such physical expansion-contraction of the plates create mechanical stresses within the battery, weakening the adhesion of the active material in the grid, and reducing the electrical continuity.

The lead-acid battery contains an aqueous solution of corrosive sulfuric acid of about 33% (v/v) at full charge. The sulfuric acid acts as an ionic conductive electrolyte and also takes part in the charge/discharge electrochemical reaction. Since the voltages required for complete battery re-charge are above that for the hydrolysis of water, oxygen is generated at the positive plate and hydrogen at the negative plate. The battery thus requires gas venting and servicing to replace lost water. This "open" gas system is generally referred to as the "flooded design", which requires that the battery be maintained upright. The combination of the corrosive acid, and generation of oxygen and hydrogen during the charge cycle, represent a safety hazard. To resolve this issue, extensive efforts have been dedicated to fabricate so-called Valve-Regulated Lead-Acid Batteries (VRLA) containing a "fumed silica gel-acid mix" or "adsorptive glass fiber mat (AGM)" separators to entrain the corrosive sulfuric acid. Such batteries are sealed, and can be used in any orientation. U.S. Pat. No. 3,862,861 is the first one to disclose a method for fabricating such a sealed, maintenance-free lead-acid cell by utilizing an "oxygen-cycle".

The separator is a key component in the VRLA battery, determining properties such as oxygen transport, electrolyte distribution and plate expansion. Extensive work has been done to optimize such separators. For example, U.S. Pat. No. 6,689,509 describes a multilayer separator comprised of a microporous polymer layer and at least one glass fibrous layer to provide for improved tensile strength and oxygen transfer. U.S. Pat. No. 5,128,218 describes a separator comprised of coarse and fine particles of hydrous silicon dioxide. Such a design creates a large specific surface area (20-400 $m^2/g$), a porosity of 85-90%, with gas channels that permit efficient reaction for oxygen absorption.

A detailed discussed of VRLA-AGM separators is given in Chapter 7, pages 183-204, in an edited book by D. A. J. Rand, P. T. Moseley, J. Garche and C. D. Parker, titled "Valve-regulated Lead-Acid Batteries, 2004, Elsevier).

A key feature of sealed batteries is that they have a safety release pressure valve, and a mechanism for allowing oxygen and hydrogen to recombine. In the AGM design, such recombination occurs because the glass microfiber separator can adsorb large amounts of electrolyte and at the same time maintain some porosity, such that about 95% is electrolyte, with the balance void space available for rapid gas transport. Rapid oxygen transfer is not viable directly through the aqueous electrolyte due the slow diffusion rate of gas through fluid electrolyte. During charging, the electrogenerated oxygen can diffuse from the positive plate to the negative plate for oxidation with (unreacted) pure lead and for recombination with hydrogen (if excessively generated under conditions of overcharge). Use of an excess of active material at the negative plate will mitigate the generation of hydrogen. Also, use of purified active materials tends to suppress the oxygen cycle.

It is an object of the present invention to provide an improved lead-acid battery. The electrode according to the invention avoids the use of a grid or support plate and the active materials are substantially converted during each charge and discharge cycle. The invention reduces the overall battery weight, provides increased specific energy, minimizes sulfation, increases the rate of charge/discharge, decreases acid stratification and increases cycle lifetime as compared to typical prior art lead-acid batteries.

These and other objects of the invention will be appreciated by reference to the summary of the invention and to the detailed description of the preferred embodiment that follow, it being understood that not all objects are necessarily simultaneously attained by each aspect of the invention, and that not all objects are necessarily fulfilled by each claim of the application.

SUMMARY OF THE INVENTION

In one aspect, the invention comprises an electrochemical cell for a lead-acid battery, having an electrode with a high surface area, high porosity 3-dimensional lattice structure. The core of the lattice is coated with one or more corrosion resistant and conductive materials. A solid active material is distributed and retained within the coated lattice matrix. A sulfuric acid electrolyte contacts substantially all surfaces of the active material. The lattice itself acts as the current collector, as opposed to using a separate collector plate.

The inventive design does not require a separate grid or plate structure to support the solid active materials, which active materials are attached to or mechanically held by the strands of the lattice core. This approach reduces battery weight and increases the specific energy. The inventive design allows for the sulfuric acid electrolyte to be in contact with a large surface area of the distributed solid active materials, during both the charge and discharge cycle. Additionally, the invention allows for the solid active materials to be in contact with the electrically conductive coated lattice core at a myriad of contact points. Such distributed, multiple points of electrical contact avoid, for example, aggregated particles of non-conductive lead sulfate becoming electrically isolated (i.e. stranded), thereby minimizing sulfation.

The inventive electrode design also allows for a high degree of selection of the form-factor of the final overall 3-dimensional shape of the electrodes, and thus the cell or the battery. Since the electrodes can be formed from a 3-dimensional lattice structure, such a structure can be easily shaped into a myriad of configurations, thus allowing for the fabrication of unique monolithic electrode shapes. Also, one electrode shape can be the same or different for the other electrode shape. For example, one electrode can be formed into a box shape, with the second electrode having a round, square, rectangular or other shape, positioned in a cut-out within the box-shaped electrode. Alternatively, one electrode can be made cylindrical, with the second electrode also a cylindrical shape, or any other shape, and fitted into the first cylinder.

In one aspect, the invention comprises an electrochemical cell for a lead-acid battery, having an electrode with a high surface area, high porosity 3-dimensional lattice structure whose core elements are coated for corrosion resistance and conductivity. The coated core elements are substantially contiguous and electrically conducting. A solid active material is retained in the lattice by the coated core elements. A sulfuric acid electrolyte is in contact with substantially all of the exposed surfaces of the solid active material. The lattice acts as the current collector of the cell.

In an further aspect, the lattice may take the form of a scaffold of interconnected strands in an open-pore sponge or honeycomb pattern, overlapping individual core strands whose fibers are chopped or continuous, or core strands that are layered or entangled into a woven-mat pattern, a non-woven-mat pattern, or a pile.

In another aspect, the corrosion-resistant and conductive materials of the coating of the core elements are selected from the class comprising: tantalum, silicon, doped-silicon carbide, DLC, an intrinsically conductive polymer.

In a further aspect, the sulfuric acid electrolyte contains compressible inert elements so as to compensate for pressure fluctuations within the battery during the charge and discharge cycles.

In a further aspect, two the cell also comprises a similar second electrode and the molar amounts of solid active materials in each of the two electrodes are substantially the same.

In a method aspect, the invention is a method of operating a lead-acid electrochemical cell with the equal molar amounts described above, comprising periodically reversing the polarity of the electrodes after complete discharge of the lead-acid battery.

One aspect of the invention relates to a method of fabricating a high surface area, high porosity 3-dimensional lattice positive or negative electrode for use in a lead-acid battery cell. The method involves providing a lattice core made of core elements comprising glass, a polymer, a carbon material or a metal. The core elements are coated with one or more materials selected from the group comprising tantalum, nickel, silicon, doped-silicon carbide, DLC, an intrinsically conductive polymer. A solid active material is distributed for adhesion to or between the core elements of the lattice and a sulfuric acid electrolyte is provided around and substantially throughout the pores of the lattice.

Aspects of the invention relating to the selection of materials for the lattice core, the corrosion-resistant and conductive coatings and the active materials, as well as other specifications are set out in the claims appended hereto.

Aspects of the invention relate to the method of fabricating the cell where the core elements comprise glass, a polymer, a carbon-based material or a metal respectively, as described and claimed hereafter.

Other aspects of the invention are recited in the claims of this application as filed, said claims being incorporated by reference into this summary in their entirety.

The foregoing was intended as a broad summary only of certain aspects of the invention, the full scope of which will be more accurately appreciated by reference to the disclosure and to the claims that follow.

BRIEF DESCRIPTION OF THE DRAWINGS

The preferred and other embodiments of the invention will be described by reference to the drawings thereof, in which.

DETAILED DESCRIPTION OF THE PREFERRED AND OTHER EMBODIMENTS

In one aspect, the invention comprises an electrochemical cell (sometimes referred to herein as an electrode) having as its foundation a high surface area, high porosity 3-dimensional lattice structure. In this specification and in the claims, the term "lattice" is meant to refer to a 3-dimensional structure having contiguous elements comprising the core of the lattice and a matrix of gaps and/or interstitial cells extending in three dimensions, the gaps and/or cells being defined between intersections of the core elements.

Figure 1:
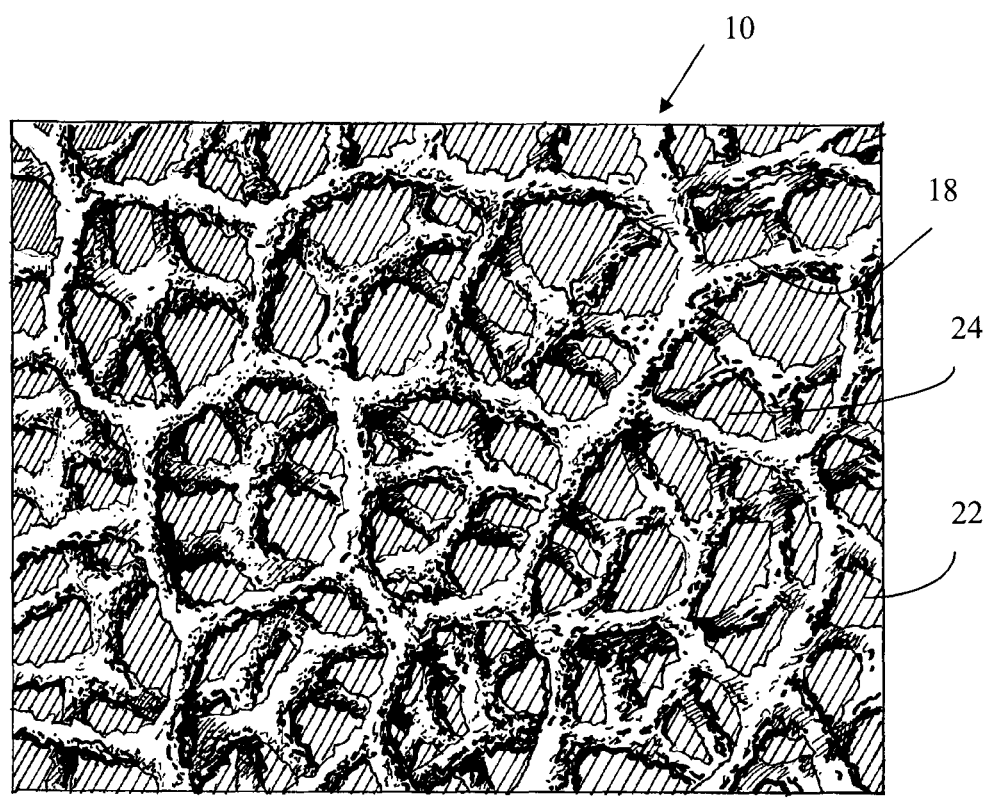
FIG. 1 shows a high surface area, high porosity 3-dimensional lattice structure having interconnected or contiguous core elements defining an open-pore sponge or honeycomb format according to the preferred embodiment.
Figure 3:
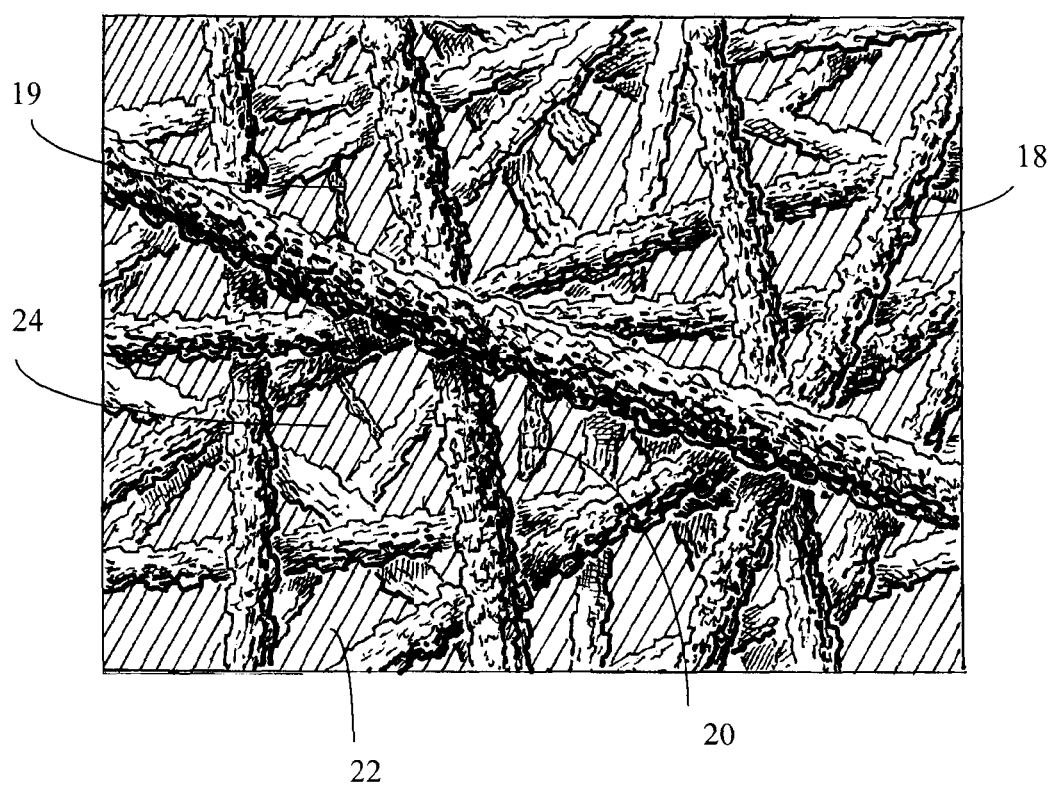
FIG. 3 illustrates a high surface area, high porosity 3-dimensional lattice structure having core elements, namely fiber strands, layered in a non-woven mat format.
Figure 4:
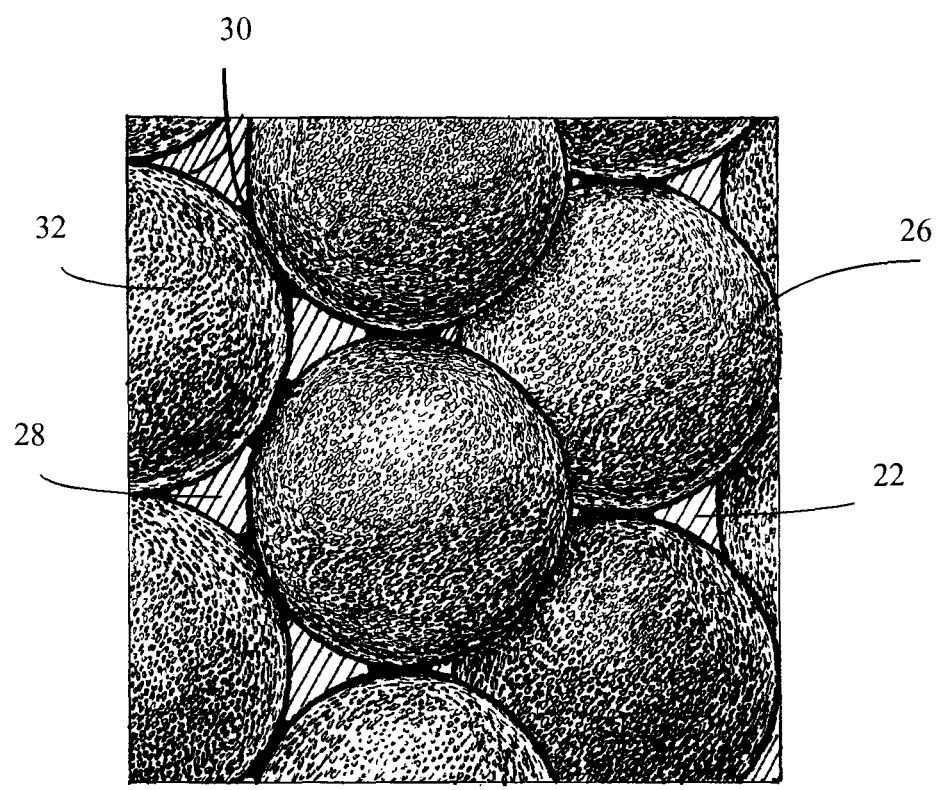
FIG. 4 is a sketch of an assembly of closely-packed porous spheres acting as core elements, which spheres form a 3-dimensional lattice structure having a plurality of connected open-channels between the spheres and nano-sized pores within each of said spheres, according to an alternative embodiment.

For example, a lattice according to the invention may comprise for example:

(a) a scaffold of interconnected core elements or strands such as an open-pore sponge or honeycomb pattern (cf. FIG. 1);

(b) overlapping individual core elements or strands, the strands being chopped or continuous, that are layered or entangled into a woven-mat pattern, a non-woven-mat pattern, or a pile of strands (cf. FIG. 3);

(c) a three-dimensional assembly of closely-packed spheres substantially touching one another, that are contiguous so as to provide electrical continuity between them, and form a plurality of connected cells or channels between them (cf. FIG. 4).

The core elements forming the lattice are coated with corrosion-resistant conductive materials and a solid active material is coated on the core elements and/or retained within the lattice matrix. A sulfuric acid electrolyte is infused into the lattice.

Figure 2:
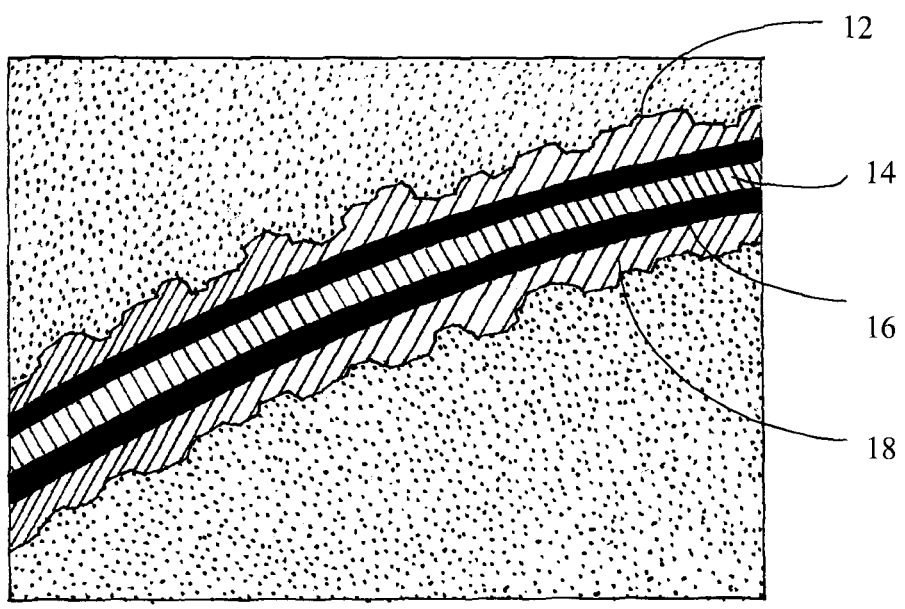
FIG. 2 portrays an enlarged longitudinal-section view of a single coated lattice core element, namely a fiber strand.

In the preferred embodiment of the electrode depicted in FIG. 1, the lattice 10 has an open-pore sponge or honeycomb format of at least 2 $m^2/g$, preferably 50-100 $m^2/g$ and ideally greater than 100 $m^2/g$. FIG. 2 is a longitudinal section of a single coated core element or strand 12 according to the preferred embodiment.

Referring to FIG. 2, the core 14 of the lattice is preferably made of glass, one or more organic polymers, carbon-based materials, metals or hybrid combinations thereof. The average diameter of the core strands is selected such that a relatively lightweight lattice structure with a wide range of porosities (50-99%) can be achieved. Depending on the core material, fiber size ranges from 1 to 200 microns in diameter, preferably about 10-50 microns. The core strands 12 may be round or irregular in cross-section.

The core elements of the lattice are protected from corrosion and the bulk of the lattice is made conductive (if the core elements are not intrinsically conductive) by applying at least one coating 16. Coating 16 may in fact consist of several layers of successive coatings as may be desired. The materials used in coating 16 depend on the material used for the core 14. However, the coating can typically be of one or more of tantalum, silicon, doped-silicon carbide, diamond-like carbon coating (DLC) and/or an intrinsically conductive polymer, preferably polyaniline, and preferably polyaniline nanofibers.

Diamond-like coatings (DLC) are a class of $sp^3$ bonded carbon atoms formed as a hexagonal lattice. Although such coatings are highly corrosion resistant they are not generally electrically conductive. However, such coatings can be made electrically conductive by, for example, doping with $sp^2$ carbon bonded carbon material (i.e. graphite), hydrogen or metals, or by exploiting the quantum mechanical tunneling property of DLC. DLC coatings can be applied by various vacuum deposition methods or ion beam deposition, preferably by coating the lattice core strands with a solution of poly(hydridocarbyne) (PHC), preferably containing dopants to enhance electrical conduction, in an inert atmosphere and heating the coated structure at over 100° C. to decompose the PHC to form a DLC coating over said core strands.

Such DLC coatings are about 0.1-5 microns thick, preferably about 0.5-2 microns thick.

Where the core element 14 is glass and is quartz or borosilicate glass, the coating 16 may be of nickel, tantalum, silicon, doped-silicon carbide (SIC), DLC, an intrinsically conducting polymer, or a combination thereof. Doped-silicon carbide is silicon carbon doped with one or more materials that increase the electrical conductivity of silicon carbide, preferably by doping with one or more of boron, aluminum or nitrogen.

A polymer-based core 14 that is not intrinsically conductive can be made of, for example, polyurethane, polyethylene, polypropylene, fluorocarbons, polyimides, acrylonitrile butadiene styrene, polyester, etc. A coating 16 for such a core may consist of doped-silicon carbide, nickel, DLC or an intrinsically conducting polymer.

A carbon-based core can comprise amorphous carbon, doped-silicon carbide, graphite or graphene. A carbon-based core format can include an open-pore foam monolithic structure, a fibrous mat, or porous carbon spheres. The coating 16 for such a core can be tantalum, silicon, doped-silicon carbide, an intrinsically conducting polymer, DLC or a combination thereof. If a silicon coating is formed over the carbon core, such a coating can also be heated to cause the silicon to chemically react with the carbon to form a silicon carbide coating, or even form a silicon carbide core.

A metal core 14 can be made of aluminum, copper or nickel, preferably electroless nickel. For a metal core, the coating 16 can be tantalum, silicon, doped-silicon carbide, an intrinsically conducting polymer, DLC or a combination thereof.

Once coated with coating 16, the interstitial cell size within the matrix of the lattice is between 0.1 and 100 microns, but preferably the coated lattice is designed to have cell sizes between 0.5 and 20 microns.

In FIGS. 1 and 2, the surface of the lattice strands 12 is depicted as having an irregular surface so as to represent a coating 18 of the solid active material attached thereto, for example lead sulfate. Some coated material 18 can also bridge across adjacent coated core elements as indicated by the numeral 19 in FIG. 3 in relation to a non-woven core but which may apply equally to the embodiment of FIG. 1. In addition unbound particles or chunks of active materials 20 (FIG. 3) may find themselves physically contained within the lattice matrix. Whether coated, bridging or loose but physically contained by contact within the lattice, the solid active material is said herein to be "retained" within the matrix or lattice.

The active materials in the electrochemical process of the cell include water, sulfuric acid ($H_2SO_4$), lead (Pb), lead dioxide ($PbO_2$) and lead sulfate ($PbSO_4$). The solid active materials include lead, lead dioxide and lead sulfate.

The solid active material 18 is preferably coated or deposited over the lattice core coating 16. In the preferred embodiment, coating 18 consists of solid reactive material, preferably lead sulfate, which is added during the initial fabrication of the electrode. The sulfuric acid electrolyte 22 is in intimate contact with all coated surfaces 18. The pore openings, gaps, cells or interstitial areas 24 are substantially filled with the sulfuric acid electrolyte 22.

FIG. 3 is similar to FIG. 1, except that the high surface area, high porosity 3-dimensional lattice structure shown in FIG. 3 has a non-woven mat format. Although FIG. 3 shows an embodiment of a lattice structure for a non-woven mat format, the lattice core strands 12 can also be layered or entangled, in any woven or non-woven pattern, or a pile pattern, and can be chopped or continuous.

An alternative assembly of closely-packed (preferably porous) carbon spheres 26 is illustrated in FIG. 4. Together, spheres 26 form a core of closely-packed spheres that touch one another and form a plurality of connected open channels, cells or pores 28.

Although sub-micron diameter non-porous carbon spheres (or irregular-shaped particles) with large surface areas per gram (i.e. 2,000 $m^2/g$) are commercially available, the closest packing arrangement of such spheres is only about 24% porosity. The efficient infusion of fluids/solids of active materials throughout such sub-micron diameter closely-packed spheres (or particles) is greatly limited (and thus impractical) due to the restricted size of the connected open-channels. Accordingly, the use of micron-sized spheres that are also porous so as to increase the effective surface area is advantageous. The net effect is that a thin layer of solid active material can be spread over a large surface area, where a large volume of active material remains electrically continuous with the underlying (coated) carbon structure at all times, thus providing for minimal sulfation and fast charge and discharge cycling.

In one embodiment, the spheres 26 have a diameter of about 0.5 to 50 microns, with pore diameters within the sphere in the range of 1 to about 3,000 nanometers. Preferably, the porous spheres have a diameter of about 1-3 microns, and a pore diameter within the sphere of about 50-200 nanometers.

The process for handling loose micron-sized spheres is challenging. Thus, it is advantageous to fuse an assembly of such spheres together for efficient handling. In one embodiment of the invention a silicon coating 30 applied onto the sphere surfaces provides not only a conductive and corrosion resistant coating, but silicon coating 30 also acts to fuse the spheres together into a solid monolithic form, assisting in the handling of the now-fused spheres.

The solid active material, preferably lead sulfate, preferably dissolved in an aqueous or non-aqueous solvent, preferably an acid (preferably hot hydrochloric acid), can then be introduced or entrained into the fused-sphere monolithic structure, with the lead sulfate precipitated from solution upon cooling. The entrained solvent can then be removed by vacuum and or heating. The resulting precipitated lead sulfate 32 coats the carbon surfaces, bridges across some pores, with some unsecured particles of lead sulfate held within the pores 28.

The packed sphere open-channels or cells 28 are then substantially filled with dilute sulfuric acid 22.

Figure 5:
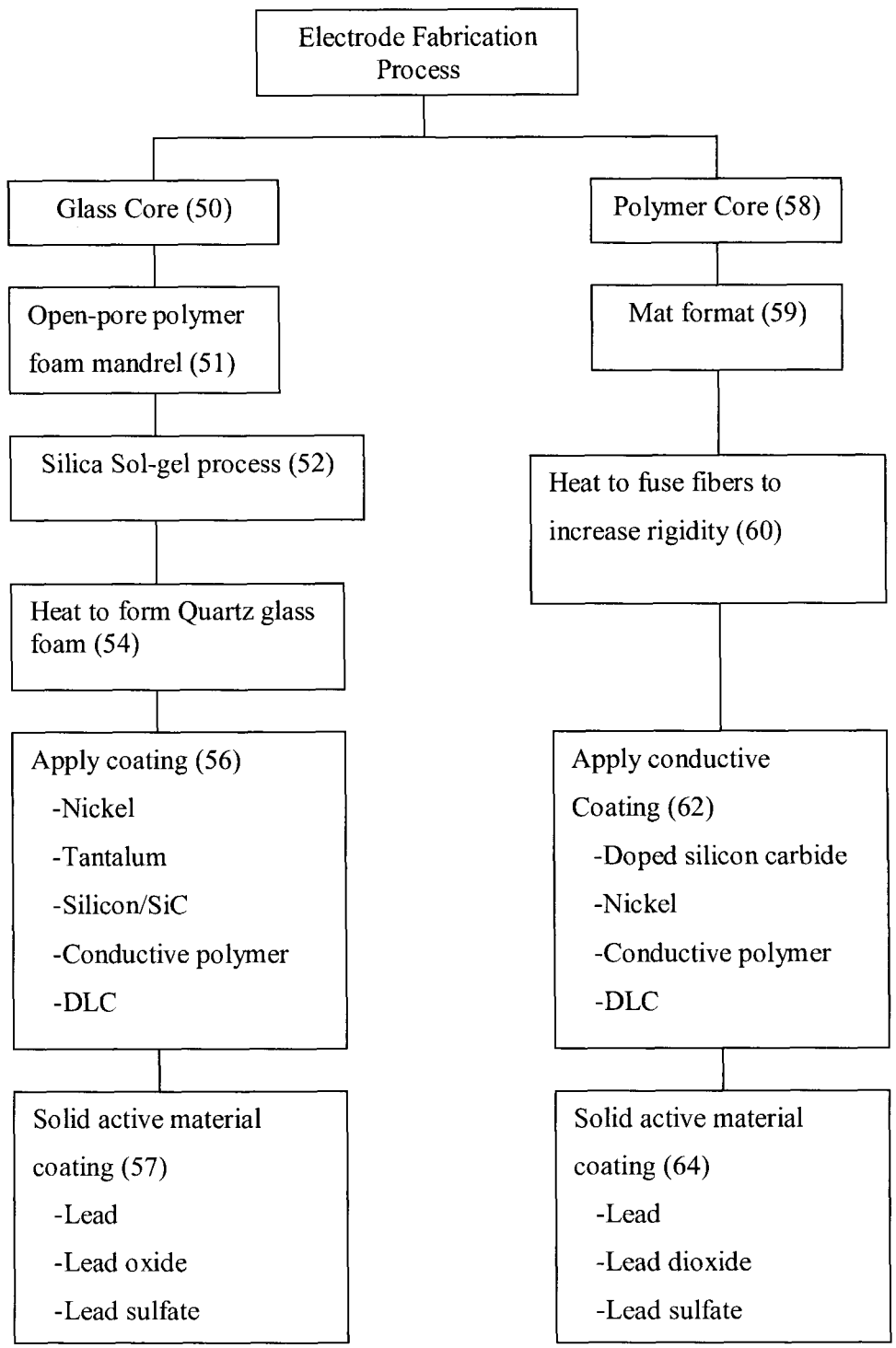
FIG. 5 is a process diagram showing alternative methods of fabricating electrodes or cells in the case of core elements of glass or polymer; and, FIG. 6 is a process diagram showing alternative methods of fabricating electrodes or cells in the case of core elements of carbon or metal.
Figure 6:
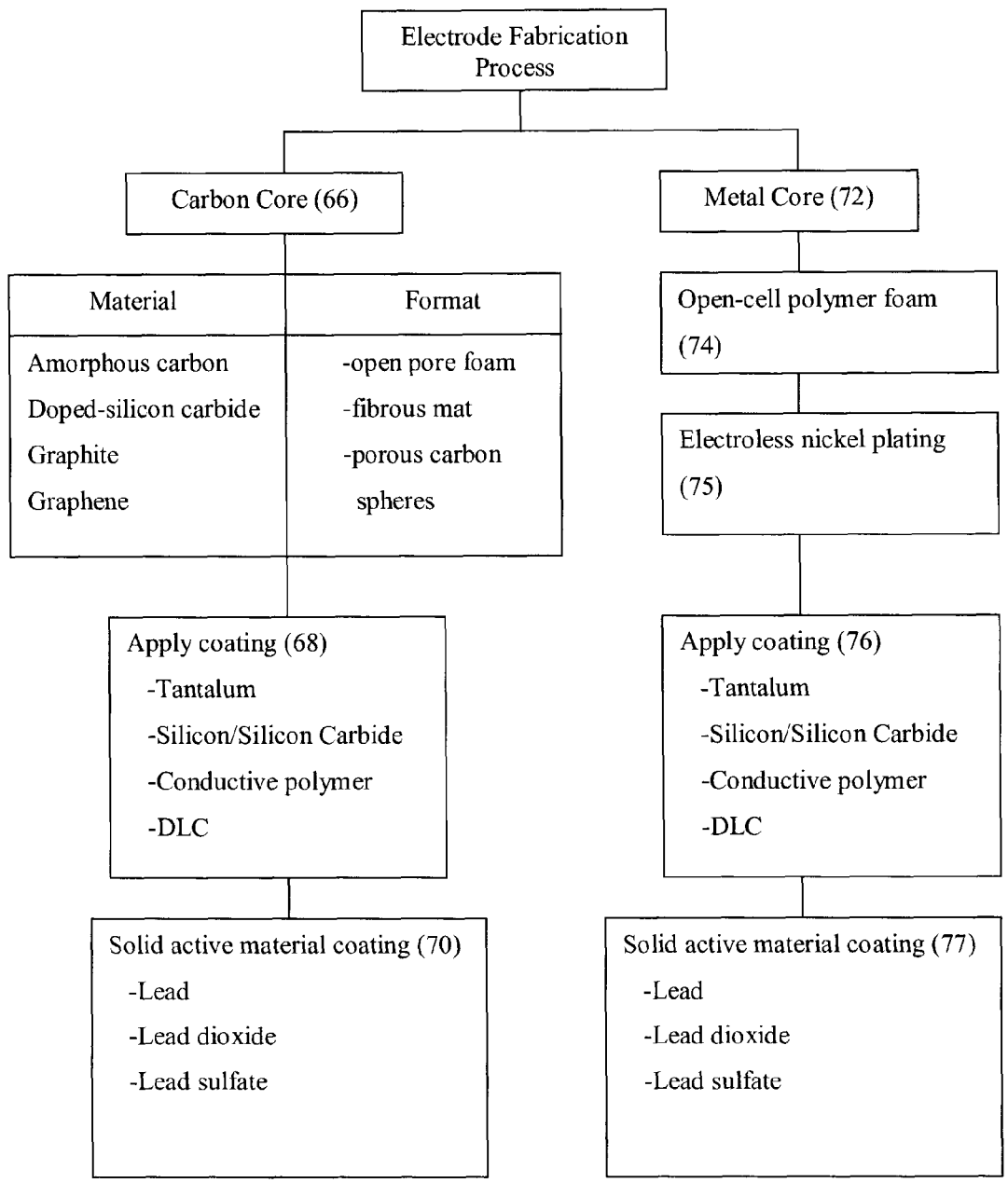

FIG. 5 is a process diagram of some of the key methods and steps for fabricating a high surface area, high porosity 3-dimensional lattice according to the preferred and alternative embodiments for use as a positive or negative electrode in a lead-acid electrochemical cell. In summary, according to the preferred embodiment, the elements making up the core of the lattice core are comprised of glass, polymers, carbon materials or metals or combinations thereof. The core elements are coated with one or more of tantalum, nickel, silicon, doped-silicon carbide, DLC, and/or an intrinsically conductive polymer, preferably polyaniline, preferably polyaniline nanofibers. An active material is coated onto or otherwise retained in the coated lattice core.

Methods for entrainment of the solid active material can be accomplished, for example, by pouring solutions of colloidal suspensions of the solid active particles through the lattice which acts as a filter, or vibrating or vacuuming fluid suspensions thereof into the porous lattice. Additionally, the lattice can be dipped, spin-coated, or soaked by aqueous or non-aqueous solutions containing dissolved solid active materials which precipitate from solution in-situ within the lattice structure, for example lead sulfate, or solutions with reactants that subsequently precipitate the reactive materials, which process would act to coat the core fibers within the lattice, bridge across some of the closely spaced pores or fibers within the lattice, and have some particles of active material mechanically held within the lattice.

Where the selected lattice core is electrically conductive, it can also be coated with lead, where such lead is electrodeposited using a fluoroborate bath solution.

The removal of any non-active material can be accomplished by washing and drying the coated lattice fibers.

A sulfuric acid electrolyte is provided within the pores or cells of the lattice. In one embodiment, compressible inert materials are added to the sulfuric acid electrolyte to compensate for volumetric changes within the battery due to the expansion of lead and lead dioxide to lead sulfate during the discharge cycle, and the contraction of lead sulfate back to lead and lead dioxide during the charge cycle. Such expansion modifiers are beneficial, especially for VRLA batteries that are sealed, to prevent and compensate for excessive pressure buildup, or pressure fluctuations. In one embodiment, such modifiers consist of closed-cell polymer balls or other shapes, comprised of, for example, from closed-cell polyurethane, polyethylene, polypropylene, polyurethane, etc. In another embodiment, an acid resistant compressible elastomeric material, of any shape, can be used. Upon re-charging the battery, the lead sulfate crystals from both electrodes will shrink upon conversion to lead and lead dioxide, thereby providing a pathway for the oxygen recombination cycle to function (for VRLA type designs). The inventive design is suitable for the flooded, or VLRA (i.e. AGM and fumed silica-gel) lead-acid battery configurations.

Incomplete chemical and corrosive reactions at the negative and positive electrode (over successive charge/discharge cycles) will tend to be cumulative. For example, over time larger sulfate crystals may aggregate and not easily convert back to lead or lead dioxide. Or, lead sulfate may not convert back to 100% lead due to secondary reactions from contaminants or oxygen and hydrogen evolution, and reactions arising therefrom, especially near the end of the charge cycle, or during overcharge. It is thus advantageous to minimize deleterious or parasitic chemical reactions from non-active material constituents or contaminants by using highly pure chemicals (for example, sulfuric acid from Seastar Chemicals Inc., Sidney, B.C. Canada, and lead sulfate from MV Laboratories, Inc., Frenchtown, N.J., USA).

The disclosed electrode acts as a current collector for the electrochemical cell, thus obviating the need for a separate plate or substrate to act as the current collector.

(a) Fabrication of Glass Core Lattice (50)

A 3-dimensional lattice structure having an open pore sponge or honeycomb structure is shown in FIG. 1. The lattice core can be made from glass, preferably quartz, which is strong and corrosion resistant in sulfuric acid, but not intrinsically conductive.

Fabrication begins with an open-pore polymer foam construct made from polyurethane, polystyrene, polyester, polyether, polyethylene, polypropylene, etc. preferably polyurethane. The foam structure is used as a mandrel (51).

The quartz lattice structure is made using a silica sol-gel process (52), where a sol containing a colloidal dispersion of silica (quartz) is coated onto the organic polymer foam, heated to about 200° C. to drive-off the water, and heated (54) at high temperature (>1,000° C.) to densify the quartz coating and drive-off the polymer foam.

Although non-conductive glass fibers can be doped with small particles of conducting materials such as silver, carbon, etc., such doped fibers are not by themselves intrinsically conducting, and thus do not have a surface that is conducting.

Accordingly, the glass lattice needs to be coated (56) with a conductive coating that is also corrosion resistant in sulfuric acid, and in the highly oxidative environment of the lead-acid battery, especially at the positive electrode.

In one embodiment, the glass lattice is coated with an intrinsically conductive polymer, such as polyparaphenylene or polyaniline, preferably polyanaline, preferably polyaniline nanofibers.

In a further embodiment, the glass lattice is first coated with nickel, preferably electroless nickel, followed by a coating of an intrinsically conductive polymer, preferably polyaniline, preferably polyaniline nanofibers.

In yet another embodiment, the glass lattice is first coated with silicon using CVD or electrochemical means. Silicon is resistant to sulfuric acid and is a semi-conductor.

In a further embodiment, the glass lattice can be coated with one or more coatings of nickel, tantalum (for high temperature glasses only, i.e. quartz), silicon, doped-silicon carbide, DLC or polyaniline. Tantalum is one of few metals resistant to sulfuric acid, and is electrically conductive. Other resistant metals such as platinum or iridium are too expensive for use in volume.

The coated quartz foam structure is then coated (57) with solid active material, for example, by electroplating lead onto the coated lattice strands, or by coating with lead sulfate, preferably by precipitating the lead sulfate in-situ within the quartz foam lattice.

One benefit of using a silica sol-gel process to create a quartz lattice is that the optical clarity of quartz allows for photo-flash welding of the polyaniline nanofibers to create a denser mat of conductive nanofibers on the surface of the quartz glass.

In a further embodiment, the use of a 3-dimensional lattice structure is made directly from chopped or continuous glass fibers, such as borosilicate glass, in a mat format (see for example FIG. 3). However, such a structure is generally too soft to support the relatively dense solid active materials to be contained therein.

In another embodiment, such a soft glass fiber lattice structure can be made more rigid by fusing together the chopped or continuous fibers, or the matted fibers, by for example, heating the fiber construct to near melting.

Thereafter, the woven or non-woven mat glass structure is coated with one or more coatings of nickel, preferably electroless nickel, tantalum, silicon, doped-silicon carbide, DLC, an intrinsically conductive polymer, such as polyaniline, preferably polyaniline nanofibers, followed by a coating of electroplated lead, or by, preferably, lead sulfate.

(b) Fabrication of Lattice Made from Organic Polymers (58)

In one embodiment, the lattice core of the open-pore structure shown in FIG. 1, and the lattice core of the non-woven mat structure shown in FIG. 3, or a mat format (59), are comprised of organic polymers such as polyurethane, polyethylene, polypropylene, fluorocarbons, polyimides, acrylonitrile butadiene styrene, polyester, etc., preferably polypropylene. Such polymers are corrosion resistant in sulfuric acid but not intrinsically conductive. In another embodiment, the non-woven mat format shown in FIG. 3, or a mat format, can be made more rigid by fusing (60) together the fibers within the mat polymer structure by heating the fiber construct to near melting, using, for example, heat, ultrasonic welding or laser welding. An increase in lattice rigidity is advantageous to help support the relatively heavy solid active materials, especially if small diameter fibers are used. In this embodiment, fibers can be coated (62) with, first, nickel, preferably electroless nickel, followed by an intrinsically conductive polymer, preferably polyaniline, preferably polyaniline nanofibers, followed by a coating (64) with a solid active material, preferably lead sulfate.

In another embodiment, the polymer fibers can be coated with a solution of poly(methylsilyne), which coating can be thermally decomposed in an inert atmosphere at a low temperature to create a coating of silicon carbide, which coating can be doped to enhance the electrical conductivity, followed by a coating with a solid active material, such as electroplated lead, preferably lead sulfate.

In a further embodiment, intrinsically conductive fibers such as polyanaline or polyparaphenylene, preferably polyaniline, can be used directly to form a 3-dimensional fibrous structure. Such a structure can then be coated, and entrained, with solid active materials, such as electroplated lead, preferably lead sulfate.

(c) Fabrication of Lattice Made from Carbon Material (66)

Lattice cores made from carbon material, such as amorphous carbon, doped-silicon carbide, graphite or graphene, with a structure comprising an open-pore lattice format, fibrous mat, solid carbon spheres or porous carbon spheres, are generally corrosion resistant and intrinsically conductive. However, the oxidation/reduction regime and sulfuric acid environment of the lead-acid battery tends to breakdown carbon-based materials, resulting in the generation of carbon dioxide ($CO_2$). Accordingly, it is generally necessary to provide a conductive, protective coating over the carbon-based materials.

In one embodiment, the carbon-based material is coated (68) with an intrinsically conductive polymer, such as polyaniline, preferably polyanaline nanofibers.

In a further embodiment, the carbon-based material is coated with tantalum, preferably using a chemical vapor deposition (CVD) technique.

In another embodiment, the carbon-based material is coated with silicon, using preferably, a CVD-silane gas process. A further aspect of such a coating is the formation of a silicon carbide coating by, preferably, further heating the silicon coated carbon in a vacuum. It is advantageous to dope the silicon carbide coating with, for example, boron, aluminum or nitrogen to increase the electrical conductivity.

In a further embodiment, such dopant materials are preferably incorporated into the silicon carbide coating by doping a solvent solution containing poly(methylsilyne) and decomposing such a solution by heating in an inert atmosphere.

In one embodiment, the carbon-based material is coated with a CVD process using silane gas, methane gas and nitrogen, where said gases form a doped-silicon carbide coating, upon heating, over the carbon-based material.

In yet another embodiment, the carbon-based material is coated with at least one or more coatings comprising tantalum, silicon, doped-silicon carbide, DLC or polyaniline.

In one embodiment, the carbon material is comprised of porous carbon spheres, which spheres can be fabricated using an ultrasonic spray pyrolysis process (see WO 2009/149540 A1). Such porous spheres can be packed together, and coated in a vacuum with silane gas ($SiH_4$) using a chemical vapor deposition process. Such silane coating acts to create a thin corrosion-resistant silicon (Si) coating over the outer and inner surfaces of the porous sphere. In one embodiment, further heating of the silicon coated spheres in a vacuum (or in an inert atmosphere) will act to react part or all of the silicon coating with the underlying carbon to create an adhesive coating of silicon carbide (SiC). Both silicon and silicon carbide are corrosion resistant to sulfuric acid, and are semiconductors. In one embodiment, the silicon carbide coating is doped with one or more of boron, aluminum or nitrogen to improve the electrical conductivity.

In a further embodiment, the lattice structure is comprised entirely of silicon carbide, where the silicon carbide is doped with one or more of boron, aluminum or nitrogen to increase the electrical conductivity. In a further embodiment, such dopant materials are preferably incorporated into the silicon carbide matrix by adding the dopant elements to a solvent solution containing poly(methylsilyne) and decomposing such a solution in an inert atmosphere and heating to form a doped silicon carbide lattice structure.

In one embodiment the lattice structure with a fibrous mat format is comprised of doped-silicon carbide, where such mat is fabricated by an electrospinning process, which process is commercially available.

In a yet further embodiment, the coated carbon materials are further coated (70), and entrained, with a solid active material, such as electroplated lead, or, preferably, coated with lead sulfate.

(d) Fabrication of Lattice Made from Metal (72)

In one embodiment of the present invention, a metal lattice can be fabricated by using an open-pore polymer foam as a mandrel (74), where the polymer is comprised of polyurethane, polyethylene, polypropylene, fluorocarbons, polyimides, acrylonitrile butadiene styrene, polyester, etc. and coating it with nickel, preferably by electroless nickel deposition (a well known process) (75). The metal lattice is subsequently heated at high temperature to densify the electroless nickel coating, and to vaporize and drive-off the polymer, leaving only the metal lattice structure.

However, most metals will corrode in the approximately 33% v/v solution of sulfuric acid, and the oxidation/reduction regime of the lead-acid battery, especially at the positive electrode.

In one embodiment, the open-pore format shown in FIG. 1, or the non-woven mat format shown in FIG. 3, or a mat format, made using a metal lattice, are coated (76) with one or more conductive protective coatings of tantalum, silicon, doped-silicon carbide, DLC or an intrinsically conducing polymer such as polyparaphenylene or polyaniline, preferably polyaniline, preferably polyaniline nanofibers.

The coated metal lattice is then entrained (77) with a solid active material, for example electrodeposited lead, preferably lead sulfate, preferably by precipitating the lead sulfate in-situ within the metal lattice. Dilute sulfuric acid electrolyte is subsequently added. The metal lattice can then be used as an electrode in a lead-acid battery.

In a battery embodiment of the invention, two electrodes are initially coated with substantially equal molar amounts of solid active materials, namely lead, lead dioxide, or preferably, lead sulfate. This provides an opportunity to periodically reverse the polarity of the electrodes.

When the battery according to the invention is charged for the first time, if a lead sulfate coating is used, lead and lead dioxide are formed on the negative and positive electrodes, respectively. Such a design does not require forming of the batteries, and is convenient from a production perspective since only one solid active material (i.e. lead sulfate) is required.

Upon subsequent complete battery discharge, where the active materials at both electrodes comprise substantially only lead sulfate, the stoichiometry of the active materials is set such that the sulfuric acid electrolyte is dilute, preferably about 1%-10% v/v so as to maintain an ionic conductivity. Such design minimizes the molar amount of sulfuric acid.

Where equal molar weights of the active material is provided in the lattice of each electrode, the polarity of the battery electrodes may be periodically reversed, which reversal is initiated when the battery is completely discharged, so as to reduce and minimize the build-up of reaction products resulting from cumulative irreversible chemical reactions. Those skilled in the art will understand that the method for a polarity reversal can be realized by monitoring and adjusting the battery charge/discharge algorithm protocol.

The various embodiments and features of the invention have been described herein. It will be appreciated that variations may be practised without departing from the scope of what has been invented, such scope being defined by the claims as amended from time to time.

What is claimed is:

1. A lead acid electrochemical cell comprising two electrodes and a sulfuric acid electrolyte characterized by:
    at least one of said two electrodes comprising a high surface area, porous, open-pore foam construct forming a three-dimensional lattice structure of a uniform material, having contiguous elements comprising a core of the lattice and a matrix of interstitial cells extending in three dimensions, the interstitial cells being defined between intersections of the elements;
    substantially the entirety of said elements being coated with doped diamond-like carbon;
    said coated elements being substantially contiguous and electrically conducting;
    a solid active material retained in said lattice by said coated elements;
    said sulfuric acid electrolyte in contact with substantially all of the exposed surfaces of said solid active material; and,
    wherein said lattice acts as a current collector of said electrochemical cell.

2. The electrochemical cell according to claim 1 wherein said elements comprise strands and said lattice structure comprises a scaffold of interconnected strands in an open-pore sponge or honeycomb pattern.

3. The electrochemical cell according to claim 1 wherein said sulfuric acid electrolyte contains compressible inert elements so as to compensate for pressure fluctuations within said electrochemical cell during charge and discharge cycles and said compressible inert elements are selected from among the group comprising elastomeric materials and polymer materials.

4. The electrochemical cell according to claim 1 wherein each of said electrodes comprises a high surface area, porous, open-pore foam construct forming a three-dimensional lattice structure of a uniform material, having contiguous elements comprising a core of the lattice and a matrix of interstitial cells extending in three dimensions, the interstitial cells being defined between intersections of the elements, substantially the entirety of said elements being coated with doped diamond-like carbon, said coated elements being substantially contiguous and electrically conducting, a solid active material comprising lead, lead dioxide or lead sulfate retained in said lattice by said coated elements and said sulfuric acid electrolyte in contact with substantially all of the exposed surfaces of said solid active material, and wherein the molar amounts of solid active materials in each of said two electrodes are substantially the same.

5. The electrochemical cell according to claim 1 wherein said elements are comprised of glass, an organic polymer, a carbon-based material, a metal or a hybrid combination thereof.

6. The electrochemical cell according to claim 1 wherein said lattice structure has a porosity between 50% and 99%.

* * * * *